US009583906B2

(12) United States Patent
Cloer

(10) Patent No.: US 9,583,906 B2
(45) Date of Patent: Feb. 28, 2017

(54) METHOD AND SYSTEM FOR POWER CONNECTOR REMOVAL

(71) Applicant: Fujitsu Network Communications, Inc., Richardson, TX (US)

(72) Inventor: Jimmy Kevin Cloer, Garland, TX (US)

(73) Assignee: Fujitsu Limited, Kawasaki (JP)

( * ) Notice: Subject to any disclaimer, the term of this patent is extended or adjusted under 35 U.S.C. 154(b) by 750 days.

(21) Appl. No.: 13/886,837

(22) Filed: May 3, 2013

(65) Prior Publication Data

US 2014/0325835 A1 Nov. 6, 2014

(51) Int. Cl.
*B23P 19/00* (2006.01)
*H01R 43/20* (2006.01)

(52) U.S. Cl.
CPC ........ *H01R 43/205* (2013.01); *Y10T 29/49124* (2015.01); *Y10T 29/53274* (2015.01)

(58) Field of Classification Search
CPC . H01R 43/205; H01R 43/26; Y10T 29/53274; Y10T 29/49124
USPC .................................................... 29/762, 729
See application file for complete search history.

(56) References Cited

U.S. PATENT DOCUMENTS 4,028,790 A 6/1977 Dupuis
4,089,104 A 5/1978 Barry et al.
4,152,827 A * 5/1979 Walton, II .......... H05K 13/0491 29/278
4,392,301 A 7/1983 Hannes et al.
5,062,201 A * 11/1991 Long, Jr. ............ H05K 13/0491 29/741
7,992,289 B2 8/2011 Cloer

OTHER PUBLICATIONS

U.S. Appl. No. 13/546,819; pp. 15, Jul. 11, 2012.
Brochure, Instruction for All Feed-To Contact Removal Tool (7 Rows) (Z-Pack HM) Male, AMP, AMP-Holland B.V., Instruction Sheet 411-19301, EH-0052-94 Rev. 0, 2 pages, Feb. 2004.
Brochure, Signal Pin Contact Repair Kits 354687-1, -2, and -3 for the Z-Pack* Connector, Tyco/Electronics, AMP, Instruction Sheet 408-9979, Rev. C., 2 pages, Feb. 10, 2003.
Brochure, Instruction for Single Feed-To and -Thru Contact Removal Tool (5 Rows) (Z-Pack HM) Male, AMP, AMP-Holland B.V., Instruction Sheet 411-19296, EH-0052-94 Rev. 0, 2 pages, Feb. 2004.
Brochure, Instruction for All Feed-Thru Contact Removal Tool (7 Rows) (Z-Pack HM) Male, AMP, AMP-Holland B.V., Instruction Sheet 411-19297, EH-0052-94 Rev. 0, 2 pages, Feb. 2004.
Brochure, Instruction for All Feed-Thru Contact Removal Tool (5 Rows) (Z-Pack HM) Midplane Male, AMP, AMP-Holland B.V., Instruction Sheet 411-19300, Eh-0052-94 Rev. 0, 2 pages, Feb. 2004.

* cited by examiner

*Primary Examiner* — A. Dexter Tugbang
*Assistant Examiner* — Azm Parvez
(74) *Attorney, Agent, or Firm* — Baker Botts L.L.P.

(57) ABSTRACT

A system for removing a plurality of connectors from a circuit board includes two clamp plates. The system includes a divider plate coupled between the two clamp plates. The divider plate is configured to be positioned between adjacent rows of the plurality of connectors. The system further includes a tightening mechanism to tighten the clamp plates and the plurality of pin plates around the plurality of connectors. The system also includes an ejector coupled to the divider plate. The ejector includes a slot that corresponds to a projection on the divider plate, and the divider plate is configured to slide relative to the ejector.

6 Claims, 4 Drawing Sheets

METHOD AND SYSTEM FOR POWER CONNECTOR REMOVAL

TECHNICAL FIELD

The present invention generally relates to repair equipment for electronics, and more particularly to removal of power pin connectors from circuit boards.

BACKGROUND

During normal assembly processing of circuit boards using connectors for telecommunications and other electronic equipment, occasional repairs must be made. Sometimes the repair requires removal of the power connector or similar connectors. Power connectors have a plurality of contact elements pressed into contact holes in a printed circuit board, and usually employ a plastic housing. Power connectors are usually arranged in groups on backplane boards, such as, groups of six in two rows of three connectors. In the past, each power connector is removed manually, one at a time. This process is generally slow and labor intensive, and may also lead to stress injuries for workers who have to remove a large number of power connectors. Further, the removal of the power connector may be difficult to do without damaging the circuit board. Simple hand tools, like pliers, may also be used to remove power connectors, but these are also inadequate for many situations.

Power connectors are well-known and widely used in the electronics manufacturing industry. Power connectors are usually press-fit connectors and have a plurality of contact elements (pins) pressed into contact holes in a printed circuit board. The pins create connections between the printed circuit board and whatever components are plugged into the top side of the press-fit connector. Press-fit contacts rely on a tight-fitting mechanical mating engagement with plated holes on a circuit board in order to establish electrical contact.

SUMMARY

In particular embodiments, a system for removing a plurality of connectors from a circuit board includes two clamp plates. The system includes a divider plate coupled between the two clamp plates. The divider plate is configured to be positioned between adjacent rows of the plurality of connectors. The system further includes a tightening mechanism to tighten the clamp plates and the plurality of pin plates around the plurality of connectors. The system also includes an ejector coupled to the divider plate. The ejector includes a slot that corresponds to a projection on the divider plate, and the divider plate is configured to slide relative to the ejector.

In another embodiment, a method for removing a plurality of connectors from a circuit board includes. placing a removal tool on the plurality of connectors. The removal tool includes two clamp plates and a divider plate coupled between the two clamp plates. The divider plate is configured to be positioned between adjacent rows of the plurality of connectors. The removal tool further includes a tightening mechanism to tighten the clamp plates and the plurality of pin plates around the plurality of connectors. The removal tool also includes an ejector coupled to the divider plate. The ejector includes a slot that corresponds to a projection on the divider plate, and the divider plate is configured to slide relative to the ejector. The method includes tightening the removal tool, and actuating a lever to rotate a cam that is configured to exert force on a top surface of the ejector.

The object and advantages of the invention will be realized and attained by means of at least the features, elements, and combinations particularly pointed out in the claims. It is to be understood that both the foregoing general description and the following detailed description are exemplary and explanatory and are not restrictive of the invention, as claimed.

DETAILED DESCRIPTION

Embodiments of the present invention and its advantages are best understood by referring to FIGS. 1-4 of the drawings, like numerals being used for like and corresponding parts of the various drawings.

Figure 1:
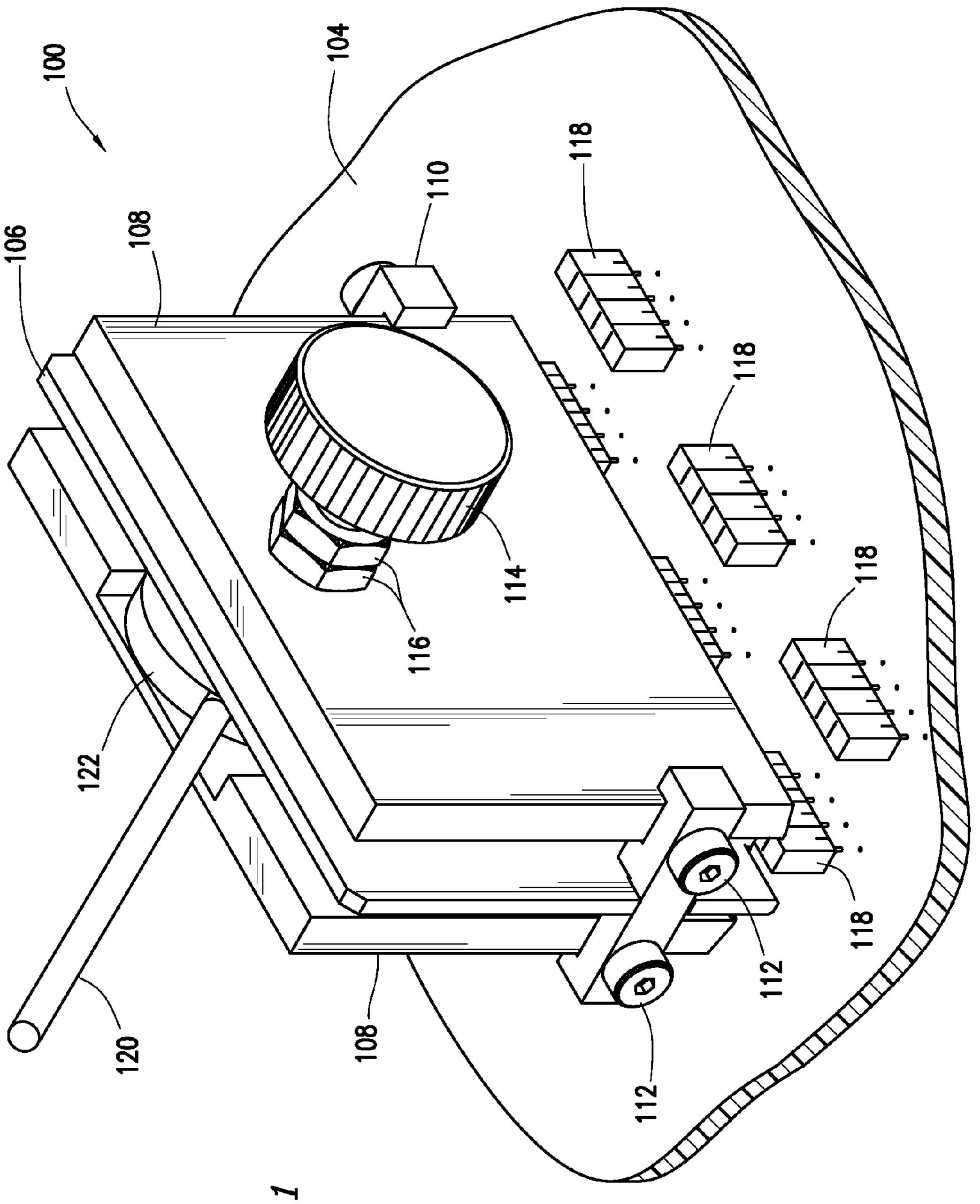
FIG. 1 illustrates an example power connector removal tool, in accordance with one embodiment of the present disclosure.

FIG. 1 illustrates an example power connector removal tool 100, in accordance with one embodiment of the present disclosure. Multiple connectors 118 may be arranged in rows of connectors 118 based on a particular implementation. For example, connectors 118 may be arranged in groups of six and configured in two rows of three connectors 118 each. Connector 118 may be protruding from backplane 104. Removal of connector 118 or groups of connectors 118 may be accomplished by the use of removal tool 100. Although removal tool 100 is shown in association with backplane 104, removal tool 100 may also be used with any other suitable type of circuit board that uses power connectors. Additionally, although removal tool 100 is shown with respect to a group of six connectors 118 (e.g., two rows of three connectors each), removal tool 100 may be of any size and configuration based on the arrangement of connectors 118 requiring removal.

In operation, removal tool 100 may sit on backplane 104. Removal tool 100 may utilize one or more clamp plates 108 and divider plate 106 that may be pressed together to grasp connectors 118 for removal. Clamp plates 108 may be configured on either side of divider plate 106. A spacer, such as spacer blocks 110, may facilitate maintaining spacing between clamp plates 108 and divider plate 106. Spacer blocks 110 may be coupled to clamp plates via shoulder screws 112. Functionally, removal tool 100 may provide an arrangement that may allow divider plate 106 and clamp plates 108 to be pressed together so that they clamp connectors 118. Thumb screw 114 may operate to loosely hold divider plate 106 in position between clamp plates 108. Thumb screw 114 may also be used to clamp divider plate 106 and clamp plates 108 onto connectors 118 for removal. Thumb screw 114 may be tightened against jam nuts 116. Jam nuts 116 may be configured to provide a stop to thumb screw 114 when sufficient tightening force is applied to grip connectors 118. After removal tool 100 is sufficiently tight against connectors 118, lever 120 may be actuated to rotate cam 122. Cam 122 may provide pressure against an ejector (discussed with reference to FIG. 2) to detach connectors 118 from backplane 104. Use of removal tool 100 may reduce the time and expense to remove groups of connectors 118 compared to use of individual connectors 118 removal methods, e.g. using pliers to remove connectors individually. Further, removal tool 100 may reduce repetitive stress injuries for users that remove a significant amount of connectors 118.

In some embodiments, connector 118 may be a power connector that may be a press-fit backplane connector. Connector 118 may be electronically connected to backplane 104 by connector pins that are press fit into contact holes in backplane 104. Connector 118 may be installed on backplane 104 using press fit, interference fit, and/or any other suitable installation method. Connector 118 may be of any suitable size and multiple connectors 118 may be grouped based on the requirements of a particular implementation.

Figure 2:
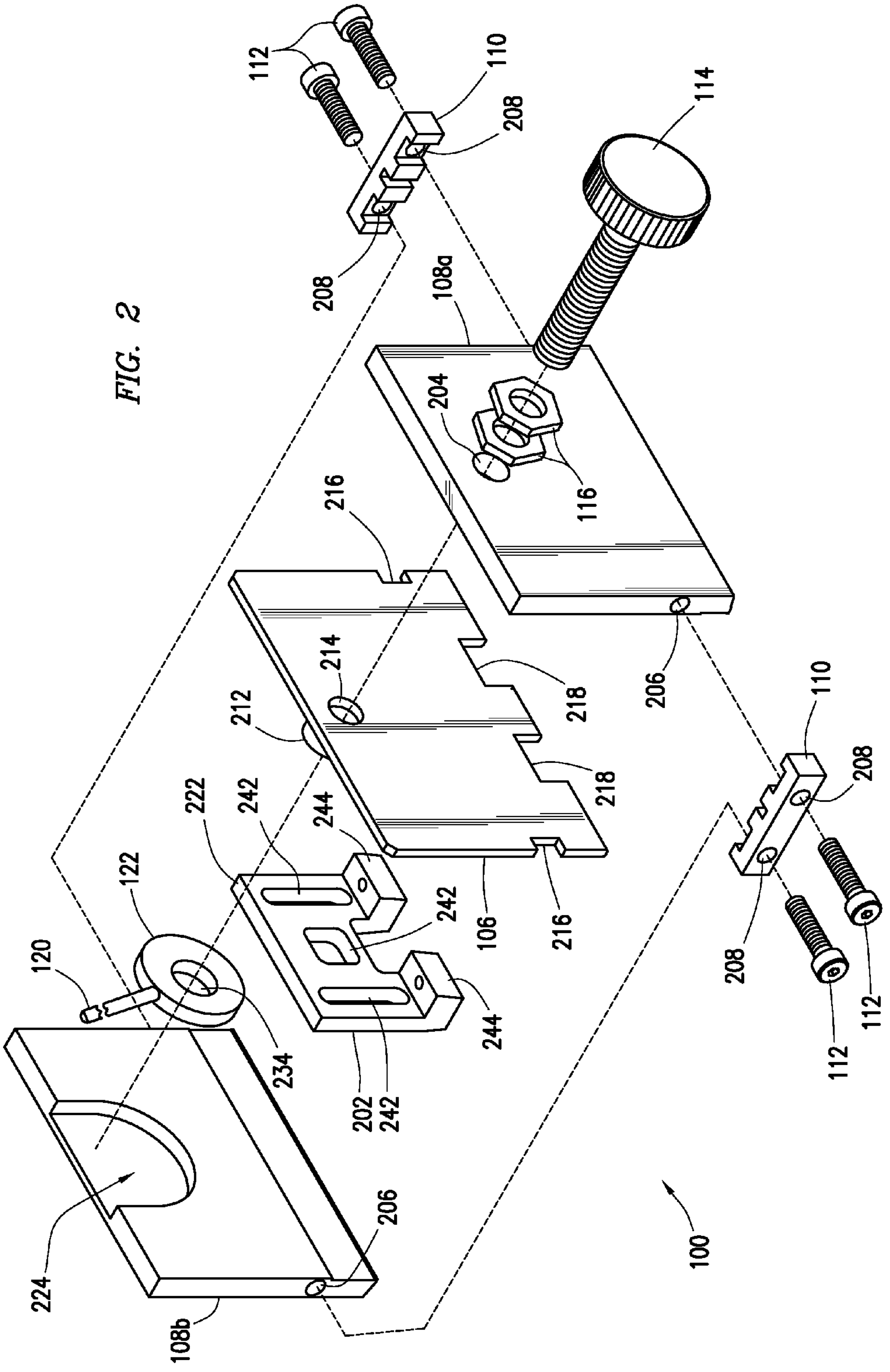
FIG. 2 illustrates an exploded view of the example power connector removal tool shown in FIG. 1, in accordance with one embodiment of the present disclosure.

FIG. 2 illustrates an exploded view of example power connector removal tool 100 shown in FIG. 1, in accordance with one embodiment of the present disclosure. In this view, the individual pieces of removal tool 100 may be seen. Removal tool 100 may include divider plate 106, clamp plates 108, spacer blocks 110, shoulder screws 112, thumb screw 114, jam nuts 116, lever 120, cam 122, ejector 202, and/or any other suitable components based on implementation. Removal tool 100 may be illustrated configured with particular dimensions, e.g., a particular height based on the height of the connector and/or group of connectors to be removed, a particular width based on the width of the connector and/or group of connectors to be removed, and a particular thickness based in part on the thickness of the connector and/or group of connectors to be removed. However, removal tool 100 may be of any dimensions suitable for a particular implementation or based on the dimensions of the connector and/or group of connectors to be removed.

Divider plate 106 may be configured to grasp connectors 118 when used in conjunction with clamp plates 108. Divider plate 106 may be manufactured from a hard material, such as metal, or any other suitable material that may withstand the clamping force applied by clamp plates 108 and thumb screw 114. The number and size of divider plates 106 may vary based on the configuration of connectors 118 to be removed, as shown in FIG. 1. The number of divider plates 106 may be based on the number of rows of connectors 118 to be removed. For example, three rows of three connectors 118 may necessitate the utilization of two divider plates 106. The number of divider plates 106 may be sufficient to grasp, when used in conjunction with clamp plates 108, two opposite sides of each connector 118 being removed.

In some embodiments, the size of divider plate 106 may vary. The thickness of divider plate 106 may be thin enough to fit between the rows of connectors 118, yet thick enough to grasp connectors 118 when force is applied to the sides of divider plate 106. Divider plate 106 may have one or more divider holes 214 allowing one or more thumb screws 114 to pass through. For example, thumb screw 114 may pass through divider hole 214 in divider plate 106 to hold divider plate 106 in parallel and aligned with any other divider plates 106 and/or clamp plates 108.

Divider plate 106 may include grooves or other gripping mechanism that may correspond with connectors 118. Grooves may allow divider plate 106 to grip connectors 118 during removal. As such, grooves may help prevent connectors 118 from slipping out when ejector 202 is activated and/or removal tool 100 is pulled away from backplane 104. Further, grooves may also act to reduce the clamping force required to adequately grip connectors 118 during removal.

Divider plate 106 may include boss 212. Boss 212 may protrude from divider plate 106. Boss 212 may be have an exterior with a perimeter that may be circular. Further, boss 212 may include divider hole 214 that may have dimensions that correspond to thumb screw 114. Exterior dimensions of boss 212 may correspond to dimensions of cam hole 234 in cam 122. Boss 212 may be configured to facilitate rotation of cam 122 when lever 120 is actuated Divider plate 106 may further include projections (as discussed with reference to FIG. 3 below) that insert into and correspond with slots 242 shown on ejector 202. One or more base notches 218 may be included on divider plate 106 that may correspond with one or more feet 244 on ejector 202. Divider plate 106 may also include one or more side notches 216 that may correspond with spacer blocks 110.

In some embodiments, one clamp plate, e.g., clamp plates 108*a* and 108*b*, collectively referred to as clamp plates 108, may be configured on each side of divider plate 106. In operation, clamp plates 108 may utilize spacer blocks 110 to maintain spacing to fit connectors 118 between clamp plates 108 and divider plate 106 based on the implementation. Clamp plates 108 may be manufactured of a hard, durable material, such as metal. In some embodiments, clamp plates 108 may have one or more holes that may be unthreaded or threaded based on the implementation. For example, clamp plate 108*a* may have thumb screw hole 204 and shoulder holes 206. As another example, clamp plate 108*b* may have shoulder holes 206. Thumb screw hole 204 and shoulder holes 206 may be threaded holes. Clamp plates 108 may also include one or more insets, such as U-shaped inset 224 on clamp plate 108*b*. Inset 224 may be of any size and/or configuration to allow one end of thumb screw 114 to press against clamp plate 108*b*. For example, during operation of removal tool 100, thumb screw 114 may be tightened through thumb screw hole 204 in clamp plate 108*a*, divider hole 214 in divider plate 106, and the one end of thumb screw 114 may press against clamp plate 108*b* in inset 224.

In some embodiments, spacer blocks 110 may provide spacing between clamp plates 108 and/or divider plate 106. Spacer blocks 110 may restrict the movement of clamp plates 108 and/or divider plate 106 during operation of removal tool 100. Spacer block 110 may contain one or more holes that may that may be unthreaded or threaded based on the implementation. For example, spacer blocks 110 may have shoulder screw holes 208 that may be threaded holes. Spacer blocks 110 may be manufactured of a hard, durable material, such as metal. Spacer blocks 110 may be configured with inset 240 that may correspond with side notch 216 on divider plate 106. Inset 240 may allow spacer blocks 110 to lock in place divider plate 106 in removal tool 100. Spacer blocks 110 may allow clamp plates 108 and divider plate 106 to be loose enough so that connectors 118 may be inserted between clamp plates 108 and divider plate 106, as shown with reference to FIG. 1. Spacer blocks 110 also, however, may allow clamp plates 108 to rotate and/or slide slightly during operation of removal tool 100. For example, as thumb screw 114 is tightened so that one end of thumb screw 114 presses against clamp plate 108*b* in inset 224, the bottom of clamp plates 108 may rotate slightly toward connectors 118. In such a case, this movement may cause clamp plates 108 and/or divider plate 106 to tighten against connectors 118.

Ejector 202 may be configured between clamp plate 108*b* and divider plate 106. Ejector 202 may be manufactured of a hard, durable material, such as metal or a hard plastic. Ejector 202 may include one or more slots 242. Slots 242 may be configured to correspond with projections (discussed with reference to FIG. 3 below) on divider plate 106. Ejector 202 may also include one or more feet 244. Feet 244 may be configured to correspond with base notches 218 on divider plate 106. Feet 244 may rest against backplane 104 during placement of removal tool 100 over connectors 118 and tightening of thumb screw 114 to provide sufficient pressure at the bottom of clamp plates 108 to grip connectors 118. During operation of removal tool 100, cam 122 may rotate to cause ejector 202 to push against backplane 104. As ejector 202 pushes against backplane 104, divider plate 106 and the rest of removal tool 100 may be slide vertically and/or away from backplane 104. This vertical motion of removal tool 100 may extract or remove connectors 118 from backplane 104.

In some embodiments, cam 122 may be coupled to lever 120. Cam 122 and lever 120 may be manufactured as one item or article of manufacture. Cam 122 and lever 120 may be manufactured of a hard durable material such as metal or hard plastic. Cam 122 and lever 120 may be configured such that movement or actuation of lever 120 rotates cam 122. Cam 122 may include cam hole 234. Cam hole 234 may correspond in dimensions to boss 212. Thus, cam 122, via cam hole 234, may fit over boss 212 on divider plate 106. As lever 120 is actuated, cam 122 may rotate about boss 212. The outer perimeter of cam 122 may be shaped as partially oval or oblong such that the distance between the outer perimeter of cam 122 and cam hole 234 is not consistent. Cam 122 may be positioned in contact with upper surface 222 of ejector 202. During rotation of cam 122, the exterior of cam 122 may press against ejector 202 and slide the rest of removal tool 100 away from backplane 104.

Figure 3:
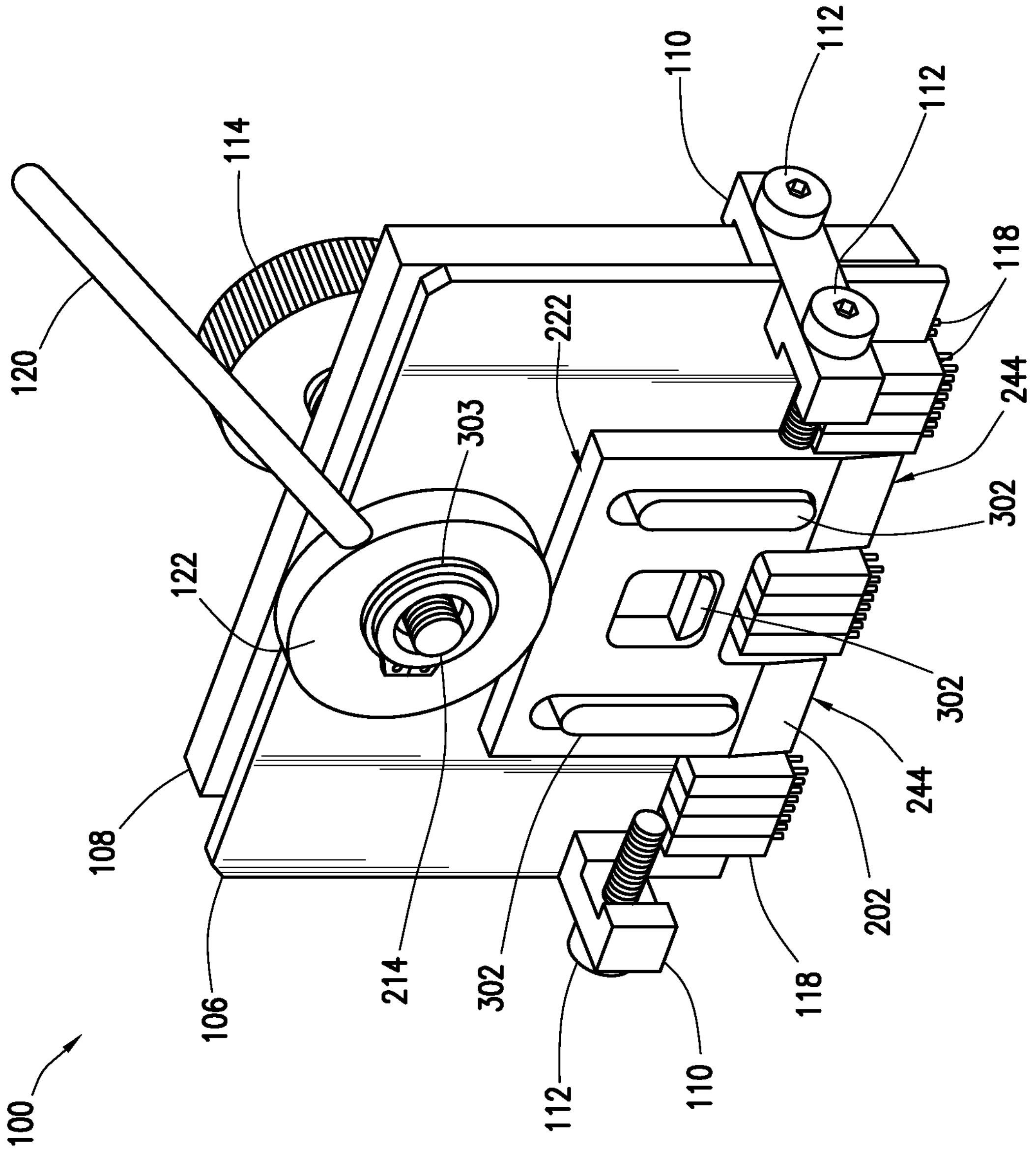
FIG. 3 illustrates a section of the example power connector removal tool shown in FIG. 1, in accordance with one embodiment of the present disclosure.

FIG. 3 illustrates a section of example power connector removal tool 100 shown in FIG. 1, in accordance with one embodiment of the present disclosure. In this view, clamp plate 108*b* may be removed such that the details of ejector 202 and divider plate 106 may be seen. Slots 242 on ejector 202 may correspond to projections 302 on divider plate 106. Slots 242 and projections 302 may be configured to allow ejector 202 to slide vertically with respect to divider plate 106. Further, boss 212 may include clamp 303 to prevent cam 122 from coming off of boss 212 during operation of removal tool 100.

When removal tool 100 is in place over connectors 118 to be removed, clamp plates 108 may be placed around connectors 118 and divider plate 106 may be placed between rows of connectors 118. Then, thumb screw 114 may be tightened until the screw head makes contact with jam nuts 116. Turning thumb screw 114 may extend thumb screw 114 through clamp plate 108*a* and divider plate 106, and the end of tightening bolt 116 may push against clamp plate 108*b* creating tension between clamp plates 108. This tension force at the top of clamp plates 108 may create a tightening force at the bottom of clamp plates 108. The tightening force at the bottom of clamp plates 108 may compress clamp plates 108 around connectors 118. Once thumb screw 114 has been tightened to where connectors 118 are sufficiently grasped by clamp plates 108 and divider plate 106, lever 120 may be actuated to rotate cam 122.

As cam 122 rotates, the exterior surface of cam 122 may push against top surface 222 of ejector 202. The pressure exerted against top surface 222 may cause feet 244 to press against backplane 104. Divider plate 106 with the rest of removal tool 100 may slide vertically and move away from backplane 104. Since connectors 118 are gripped by removal tool 100, this movement may extract connectors 118 from backplane 104.

Figure 4:
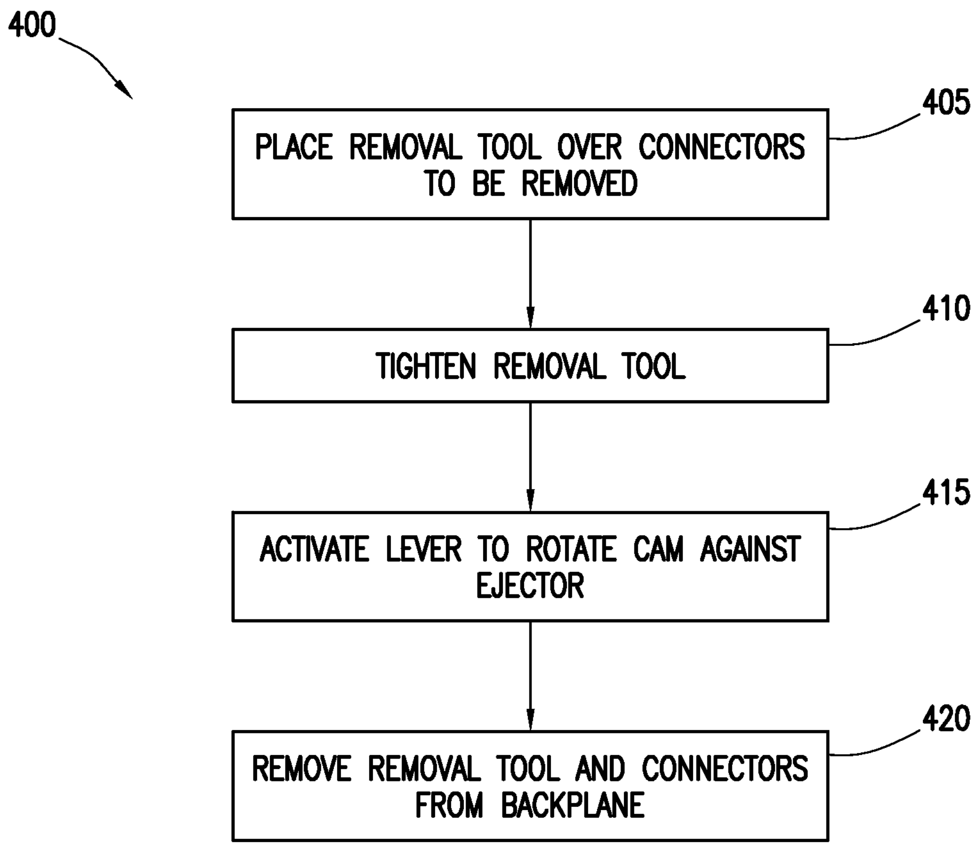
FIG. 4 illustrates an example method for removal of connectors, in accordance with one embodiment of the present disclosure.

FIG. 4 illustrates an example method 400 for removal of connectors, in accordance with one embodiment of the present disclosure. Method 400 may be implemented fully or in part by a user. For illustrative purposes, method 400 is described with respect to removal tool 100 of FIG. 1; however, method 400 may be used for any other suitable removal tool configuration. Method 400 may be performed in association with a connector, such as connector 118 of FIG. 1. Method 400 may be repeated or performed in parallel for each set of connectors 118 illustrated in FIG. 1 that require removal. In addition, although FIG. 4 discloses a certain order of steps to be taken with respect to method 400, the steps comprising method 400 may be completed in any suitable order.

At step 405, a user may place the removal tool over the connectors to be removed. As example, removal tool 100 may be placed over a particular set of connectors 118 that requires removal. Removal tool 100 may be positioned so that rows of connectors 118 are located between divider plate 106 and/or clamp plates 108. All connectors 118 that are between divider plate 106 and/or clamp plates 108 will be removed in operation of removal tool 100.

At step 410, a user may tighten the removal tool. The removal tool may be tightened in a variety of ways. For example, a user may turn thumb screw 114, shown in FIG. 1, to tighten removal tool 100. Turning thumb screw 114 may create tension at the top of clamp plates 108 and may allow the bottom of clamp plates 108 and/or divider plate 106 to grasp connectors 118 for removal.

At step 415, a user may actuate a lever to rotate a cam positioned against an ejector that causes a divider plate to move vertically with respect to the ejector. For example, with reference to FIG. 3, lever 120 may be actuated to rotate cam 122. Cam 122 may press against ejector 202 and cause divider plate 106 to slide vertically with respect to ejector 202. This vertical movement may be away from backplane 104 and may also remove connectors 118 from backplane 104.

At step 425, a user may remove the connectors and removal tool from the backplane. For example, connectors 118 and removal tool 100 may be removed from backplane 104. Thumb screw 114 may be loosened to remove connectors 118 from removal tool 100. Lever 120 may be returned to the pre-operation position and prepared to remove additional connectors 118.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A system for removing a plurality of connectors from a circuit board, comprising:

a first clamp plate and a second clamp plate arranged in parallel with respect to each other;

a divider plate arranged in parallel with the first clamp plate and the second clamp plate and coupled between the first clamp plate and the second clamp plate, the divider plate including a projection extending in a direction perpendicular to the parallel arrangement of the first clamp plate, the second clamp plate, and the divider plate, wherein the divider plate is configured to be positioned between adjacent rows of the plurality of connectors and the divider plate comprises one or more grooves configured to grip one or more of the plurality of connectors;

a tightening mechanism to tighten the first clamp plate, the second clamp plate, and the divider plate around the plurality of connectors; and an ejector coupled to the divider plate via the projection on the divider plate and a slot located on a surface of the ejector that extends in a direction parallel to the divider plate, the divider plate configured to slide relative to the ejector.

2. The system of claim 1, further comprising a cam coupled to the divider plate and the ejector, the cam configured to rotate and exert force on a top surface of the ejector.

3. The system of claim 2, further comprising a lever coupled to the cam, the lever configured to rotate the cam during actuation.

4. The system of claim 1, wherein the tightening mechanism includes a thumb screw coupling the first clamp plate, the second clamp plate, and the divider plate, the first clamp plate configured to stop the thumb screw, and the thumb screw configured to provide tension between the first clamp plate and the second clamp plate.

5. The system of claim 1, further comprising a spacer block coupling the first clamp plate, the second clamp plate, and the divider plate, the spacer block configured based on dimensions of the plurality of connectors.

6. The system of claim 5, wherein the spacer block is configured to allow rotation of the first clamp plate and the second clamp plate.

* * * * *